(12) United States Patent
Amengual Gari et al.

(10) Patent No.: US 10,971,130 B1
(45) Date of Patent: Apr. 6, 2021

(54) SOUND LEVEL REDUCTION AND AMPLIFICATION

(71) Applicant: Facebook Technologies, LLC, Menlo Park, CA (US)

(72) Inventors: Sebastià Vicenç Amengual Gari, Seattle, WA (US); Philip Robinson, Seattle, WA (US); Jacob Ryan Donley, Kirkland, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/709,587

(22) Filed: Dec. 10, 2019

(51) Int. Cl.
| | |
|---|---|
| *G10K 11/178* | (2006.01) |
| *H04R 1/40* | (2006.01) |
| *H04R 1/02* | (2006.01) |
| *H04R 3/00* | (2006.01) |

(52) U.S. Cl.
CPC .. *G10K 11/17854* (2018.01); *G10K 11/17873* (2018.01); *H04R 1/025* (2013.01); *H04R 1/406* (2013.01); *H04R 3/005* (2013.01); *G10K 2200/10* (2013.01); *G10K 2210/1081* (2013.01); *G10K 2210/3028* (2013.01); *G10K 2210/3044* (2013.01); *H04R 2420/07* (2013.01); *H04R 2430/01* (2013.01)

(58) Field of Classification Search
CPC .. H04R 25/55; H04R 25/554; H04R 2420/07; H04R 2230/01; H04R 2460/01; G10K 11/17873; G10K 2210/1081; G10K 2210/3044
See application file for complete search history.

(56) References Cited

U.S. PATENT DOCUMENTS

| | | | |
|---|---|---|---|
| 9,361,875 B2 * | 6/2016 | Meredith | G10K 11/178 |
| 10,631,108 B2 * | 4/2020 | Dundas | H04R 25/554 |
| 2007/0238490 A1 * | 10/2007 | Myrberg | H04M 1/6066 455/569.1 |
| 2016/0057549 A1 * | 2/2016 | Marquis | H03G 3/344 381/315 |

* cited by examiner

*Primary Examiner* — Kile O Blair
(74) *Attorney, Agent, or Firm* — Fenwick & West LLP

(57) ABSTRACT

A computing device, such as a headset, provides for selective sound level reduction or sound level amplification for sounds made in a local area. The computing device includes a speaker assembly and a controller. The controller receives an audio signal from a second computing device, such as a second headset, via a wireless connection with the computing device. The audio signal describes a sound made by a user of the second computing device. The audio signal arrives at the computing device prior to the sound. The controller determines an audio filter to selectively adjust an amplitude of the sound and applies the audio filter to the audio signal to generate audio content. The controller presents, via the speaker assembly, the audio content to a user such that the presented audio content combines with the sound to selectively adjust the amplitude of the sound.

20 Claims, 6 Drawing Sheets

400

Receive, at a first audio assembly, an audio signal from a second audio assembly via a wireless connection, the audio signal describing a sound made by a user of the second audio assembly, wherein the audio signal arrives at the first audio assembly prior to the sound
410

Determine an audio filter to selectively adjust an amplitude of the sound
420

Apply the audio filter to the audio signal to generate audio content
430

Presenting, via a speaker assembly of the first audio assembly, the audio content to a user of the first audio assembly such that the presented audio content combines with the sound to selectively adjust the amplitude of the sound
440

400

Receive, at a first audio assembly, an audio signal from a second audio assembly via a wireless connection, the audio signal describing a sound made by a user of the second audio assembly, wherein the audio signal arrives at the first audio assembly prior to the sound
410

↓

Determine an audio filter to selectively adjust an amplitude of the sound
420

↓

Apply the audio filter to the audio signal to generate audio content
430

↓

Presenting, via a speaker assembly of the first audio assembly, the audio content to a user of the first audio assembly such that the presented audio content combines with the sound to selectively adjust the amplitude of the sound
440

FIG. 4

SOUND LEVEL REDUCTION AND AMPLIFICATION

FIELD OF THE INVENTION

This disclosure relates generally to artificial reality systems, and more specifically to sound level reduction and amplification for artificial reality systems.

BACKGROUND

Audio assemblies, such as those used in headsets, provide audio content to users. A user may wear a headset with an audio assembly in a variety of different environmental conditions, including noisy environments where there are multiple sound sources. Sound from undesirable sources may interfere with sound from sources that the user is trying to hear. As such, it is desirable for the audio assembly to control the loudness of nearby sound sources to enhance hearing ability of the user.

SUMMARY

An audio assembly provides for selective sound level reduction or sound level amplification for sounds made by other users in a local area. Some embodiments include a method performed by the audio assembly. The method includes receiving an audio signal from a second audio assembly via a wireless connection with the second audio assembly. The audio signal describes a sound made by a user of the second audio assembly. The audio signal arrives at the first audio assembly prior to the sound. The method further includes determining an audio filter to selectively adjust (e.g., attenuate or amplify) an amplitude of the sound, and applying the audio filter to the audio signal to generate audio content. The method further includes presenting, via a speaker assembly of the first audio assembly, the audio content to a user of the first audio assembly such that the presented audio content combines with the sound to selectively adjust the amplitude of the sound.

Some embodiments include a computing device. The computing device includes a speaker assembly and a controller. The controller receives an audio signal from a second computing device via a wireless connection with the computing device. The audio signal describes a sound made by a user of the second computing device. The audio signal arrives at the computing device prior to the sound. The controller determines an audio filter to selectively adjust an amplitude of the sound and applies the audio filter to the audio signal to generate audio content. The controller presents, via the speaker assembly, the audio content to a user such that the presented audio content combines with the sound to selectively adjust the amplitude of the sound.

Some embodiments include a non-transitory computer readable medium storing instructions that, when executed by a processor, configure the processor to: receive an audio signal from a computing device via a wireless connection with the computing device, the audio signal describing a sound made by a user of the computing device, wherein the audio signal arrives at a speaker assembly prior to the sound; determine an audio filter to selectively adjust an amplitude of the sound; apply the audio filter to the audio signal to generate audio content; and present, via the speaker assembly, the audio content to a user such that the presented audio content combines with the sound to selectively adjust the amplitude of the sound.

BRIEF DESCRIPTION OF THE DRAWINGS

FIG. 4 is a flowchart illustrating a process for adjusting an amplitude of sound, in accordance with one or more embodiments.

Figure 1A:
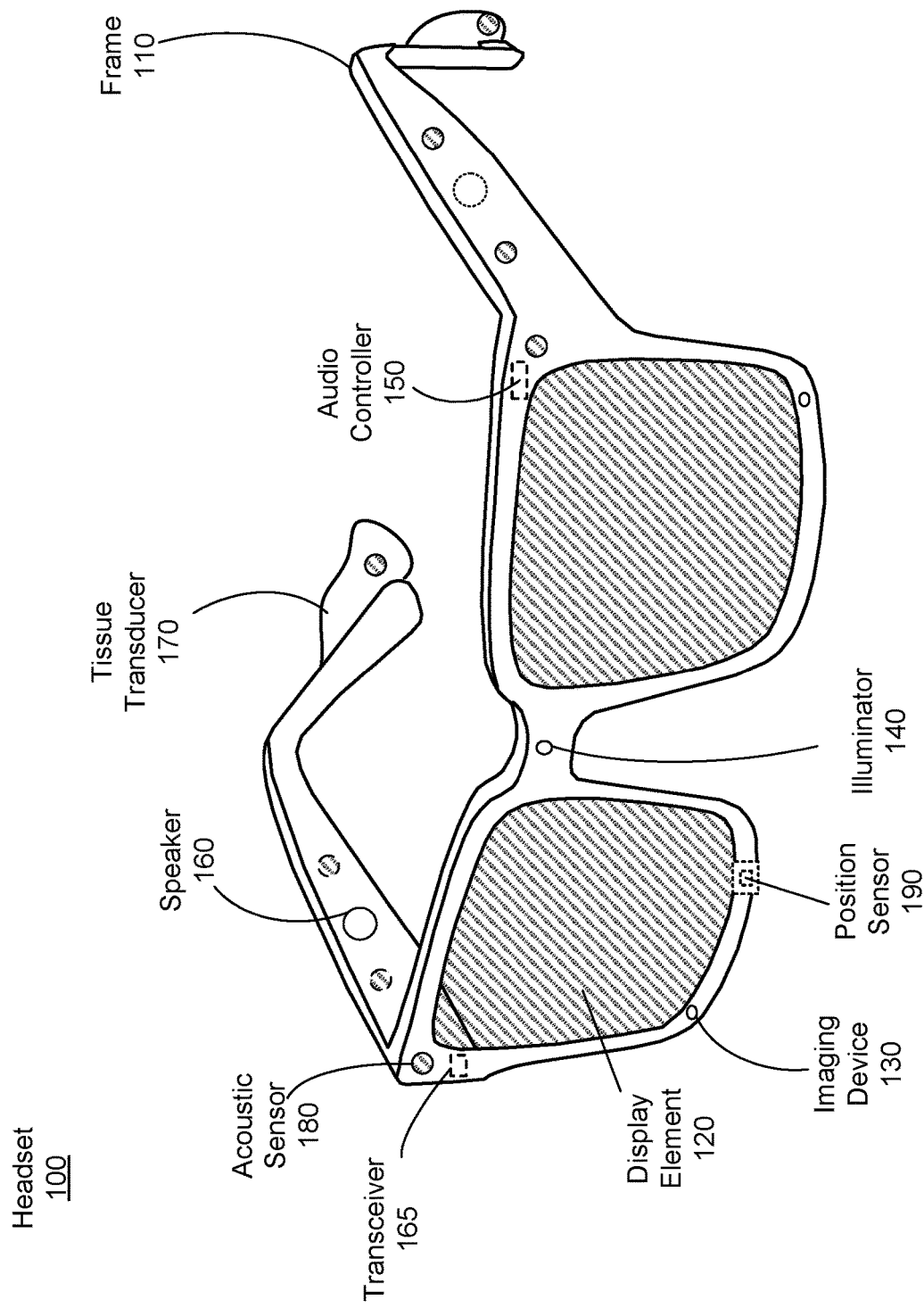
FIG. 1A is a perspective view of a headset implemented as an eyewear device, in accordance with one or more embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

An audio assembly, which may be located in a headset or some other computing device, provides for selective adjustment (e.g., sound level reduction, sound level amplification, and/or sound level equalization) for sounds made by other users in a local area. For example, a user wearing the headset is in a local area with another user wearing a headset, or similar type of computing device. The headset of the other user captures sound may be the other user (e.g., speech) as an audio signal and wirelessly transmits the audio signal to the audio assembly. The audio signal arrives at the audio assembly prior to the sound arriving at the audio assembly. The earlier arrival of the audio signal gives the headset time to generate and apply appropriate filters to the audio signal. Based on configuration settings, the audio assembly determines an audio filter to selectively adjust an amplitude of the sound, and applies the audio filter to the audio signal to generate audio content. Information about the local area (e.g., room) may also be used in generating the audio filter for attenuation/amplification, such as reverberation time. The audio content is provided to a speaker assembly of the audio assembly for presentation as the sound arrives at the speaker assembly. Sound generated by the speaker assembly based on the audio content provides sound level reduction via destructive interference with the sound from the other user or sound level amplification via constructive interference with the sound from the other user.

In some embodiments, a user with a headset selectively reduces or amplifies the sound level from various sound sources. For example, a first user may be muted while another user may be amplified. The ability to control the loudness of certain sources in noisy environments is one of the key experiences to deliver in terms of providing a superhuman hearing ability.

The use of wireless audio signals is advantageous to active noise cancellation (ANC) headphones that use microphones close to the ear canal to capture the sound. ANC is limited by the ability to cleanly retrieve the undesired signal, and reproduce an inverted version of this at the ear, achieving a reduction in total sound pressure. One big challenge with active noise cancellation is that the cancellation signal must be calculated and reproduced extremely quickly. In the case of noise cancelling headphones, the signal to be rejected is received by microphones on the outside of the device. Before that sound wave reached the listeners ear drum, the anti-signal must be calculated and played over the headphone speaker, this is a matter of nanoseconds. If the signal to be rejected can be captured further from the listener, it buys more time to do the cancellation processing. By using a remote microphone and transmitting the audio signal, sound is effectively transmitted at the speed of light, thereby arriving before the acoustic sound wave. Since the device at the receiving end knows what signal is coming in advance, it can more effectively eliminate it when it arrives.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to create content in an artificial reality and/or are otherwise used in an artificial reality. The artificial reality system that provides the artificial reality content may be implemented on various platforms, including a wearable device (e.g., headset) connected to a host computer system, a standalone wearable device (e.g., headset), a mobile device or computing system, or any other hardware platform capable of providing artificial reality content to one or more viewers.

FIG. 1A is a perspective view of a headset 100 implemented as an eyewear device, in accordance with one or more embodiments. In some embodiments, the eyewear device is a near eye display (NED). In general, the headset 100 may be worn on the face of a user such that content (e.g., media content) is presented using a display assembly and/or an audio assembly (also referred to as an "audio system"). However, the headset 100 may also be used such that media content is presented to a user in a different manner. Examples of media content presented by the headset 100 include one or more images, video, audio, or some combination thereof. The headset 100 includes a frame, and may include, among other components, a display assembly including one or more display elements 120, a depth camera assembly (DCA), an audio system, and a position sensor 190. While FIG. 1A illustrates the components of the headset 100 in example locations on the headset 100, the components may be located elsewhere on the headset 100, on a peripheral device paired with the headset 100, or some combination thereof. Similarly, there may be more or fewer components on the headset 100 than what is shown in FIG. 1A.

The frame 110 holds the other components of the headset 100. The frame 110 includes a front part that holds the one or more display elements 120 and end pieces (e.g., temples) to attach to a head of the user. The front part of the frame 110 bridges the top of a nose of the user. The length of the end pieces may be adjustable (e.g., adjustable temple length) to fit different users. The end pieces may also include a portion that curls behind the ear of the user (e.g., temple tip, ear piece).

The one or more display elements 120 provide light to a user wearing the headset 100. As illustrated the headset includes a display element 120 for each eye of a user. In some embodiments, a display element 120 generates image light that is provided to an eyebox of the headset 100. The eyebox is a location in space that an eye of user occupies while wearing the headset 100. For example, a display element 120 may be a waveguide display. A waveguide display includes a light source (e.g., a two-dimensional source, one or more line sources, one or more point sources, etc.) and one or more waveguides. Light from the light source is in-coupled into the one or more waveguides which outputs the light in a manner such that there is pupil replication in an eyebox of the headset 100. In-coupling and/or outcoupling of light from the one or more waveguides may be done using one or more diffraction gratings. In some embodiments, the waveguide display includes a scanning element (e.g., waveguide, mirror, etc.) that scans light from the light source as it is in-coupled into the one or more waveguides. Note that in some embodiments, one or both of the display elements 120 are opaque and do not transmit light from a local area around the headset 100. The local area is the area surrounding the headset 100. For example, the local area may be a room that a user wearing the headset 100 is inside, or the user wearing the headset 100 may be outside and the local area is an outside area. In this context, the headset 100 generates VR content. Alternatively, in some embodiments, one or both of the display elements 120 are at least partially transparent, such that light from the local area may be combined with light from the one or more display elements to produce AR and/or MR content.

In some embodiments, a display element 120 does not generate image light, and instead is a lens that transmits light from the local area to the eyebox. For example, one or both of the display elements 120 may be a lens without correction (non-prescription) or a prescription lens (e.g., single vision, bifocal and trifocal, or progressive) to help correct for defects in a user's eyesight. In some embodiments, the display element 120 may be polarized and/or tinted to protect the user's eyes from the sun.

In some embodiments, the display element 120 may include an additional optics block (not shown). The optics block may include one or more optical elements (e.g., lens, Fresnel lens, etc.) that direct light from the display element 120 to the eyebox. The optics block may, e.g., correct for aberrations in some or all of the image content, magnify some or all of the image, or some combination thereof.

The DCA determines depth information for a portion of a local area surrounding the headset 100. The DCA includes one or more imaging devices 130 and a DCA controller (not shown in FIG. 1A), and may also include an illuminator 140. In some embodiments, the illuminator 140 illuminates a portion of the local area with light. The light may be, e.g., structured light (e.g., dot pattern, bars, etc.) in the infrared (IR), IR flash for time-of-flight, etc. In some embodiments, the one or more imaging devices 130 capture images of the portion of the local area that include the light from the illuminator 140. As illustrated, FIG. 1A shows a single illuminator 140 and two imaging devices 130. In alternate embodiments, there is no illuminator 140 and at least two imaging devices 130.

The DCA controller computes depth information for the portion of the local area using the captured images and one or more depth determination techniques. The depth determination technique may be, e.g., direct time-of-flight (ToF) depth sensing, indirect ToF depth sensing, structured light, passive stereo analysis, active stereo analysis (uses texture added to the scene by light from the illuminator 140), some other technique to determine depth of a scene, or some combination thereof.

The audio system (also referred to herein as an "audio assembly") provides audio content. The audio system includes a transducer array, a sensor array, and an audio controller 150. However, in other embodiments, the audio system may include different and/or additional components. Similarly, in some cases, functionality described with reference to the components of the audio system can be distributed among the components in a different manner than is described here. For example, some or all of the functions of the controller may be performed by a remote server. The audio assembly may be part of a headset, or some other computing device (e.g., a mobile phone, a smart watch, a wearable device, a tablet, a laptop computer, a desktop computer, etc.).

The transducer array presents sound to user. The transducer array includes a plurality of transducers. A transducer may be a speaker 160 or a tissue transducer 170 (e.g., a bone conduction transducer or a cartilage conduction transducer). Although the speakers 160 are shown exterior to the frame 110, the speakers 160 may be enclosed in the frame 110. In some embodiments, instead of individual speakers for each ear, the headset 100 includes a speaker array comprising multiple speakers integrated into the frame 110 to improve directionality of presented audio content. The tissue transducer 170 couples to the head of the user and directly vibrates tissue (e.g., bone or cartilage) of the user to generate sound. The number and/or locations of transducers may be different from what is shown in FIG. 1A.

The sensor array detects sounds within the local area of the headset 100. The sensor array includes a plurality of acoustic sensors 180. An acoustic sensor 180 captures sounds emitted from one or more sound sources in the local area (e.g., a room). Each acoustic sensor is configured to detect sound and convert the detected sound into an electronic format (analog or digital). The acoustic sensors 180 may be acoustic wave sensors, microphones, sound transducers, or similar sensors that are suitable for detecting sounds.

In some embodiments, one or more acoustic sensors 180 may be placed in an ear canal of each ear (e.g., acting as binaural microphones). In some embodiments, the acoustic sensors 180 may be placed on an exterior surface of the headset 100, placed on an interior surface of the headset 100, separate from the headset 100 (e.g., part of some other device), or some combination thereof. The number and/or locations of acoustic sensors 180 may be different from what is shown in FIG. 1A. For example, the number of acoustic detection locations may be increased to increase the amount of audio information collected and the sensitivity and/or accuracy of the information. The acoustic detection locations may be oriented such that the microphone is able to detect sounds in a wide range of directions surrounding the user wearing the headset 100.

The transceiver 165 forms wireless connections with other computing devices for sending and receiving data. For example, transceiver 165 receives audio signals from other devices, or transmits audio signals captured by the acoustic sensor 180 to other devices.

The audio controller 150 facilitates sound level reduction or amplification for sound made by other users wearing headsets or similar devices. The transceiver 165 wirelessly receives an audio signal from another headset that describes the sound made by a user of the other headset, and provides the audio signal to the audio controller 150. The audio controller 150 determines whether to provide sound level reduction or sound level amplification (e.g., based on user selection), and determines an audio filter to selectively adjust the amplitude of the sound accordingly. To provide spatialized reduction or amplification, the audio filter models a change in the sound caused by propagation from the other headset to a speaker assembly (e.g., speakers 160) of the headset 100. The model may include direct sounds and reverberations. To provide sound level reduction, the audio filter inverts the audio content. The audio filter may also apply a gain to the audio content to control the amount of sound level reduction or amplification. The audio controller 150 present the audio content to the user of the headset 100 (via speakers 160 or transducers 170) such that the presented audio content combines with the sound from the user to selectively adjust the amplitude of the sound. The audio content is presented at time that corresponds with the sound from other user arriving at the headset 100 to provide sound level reduction via destructive interference or sound level amplification via constructive interference.

In some embodiments, the audio controller 150 processes information from the sensor array that describes sounds detected by the sensor array. The audio controller 150 may be configured to generate direction of arrival (DOA) estimates, generate acoustic transfer functions (e.g., array transfer functions and/or head-related transfer functions), track the location of sound sources, form beams in the direction of sound sources, classify sound sources, generate sound filters for the speakers 160, or some combination thereof. The audio controller 150 may comprise a processor and a computer-readable storage medium.

The position sensor 190 generates one or more measurement signals in response to motion of the headset 100. The position sensor 190 may be located on a portion of the frame 110 of the headset 100. The position sensor 190 may include an inertial measurement unit (IMU). Examples of position sensor 190 include: one or more accelerometers, one or more gyroscopes, one or more magnetometers, another suitable type of sensor that detects motion, a type of sensor used for error correction of the IMU, or some combination thereof. The position sensor 190 may be located external to the IMU, internal to the IMU, or some combination thereof.

In some embodiments, the headset 100 may provide for simultaneous localization and mapping (SLAM) for a position and orientation of the headset 100, position of other headsets or devices, and updating of a model of the local area. For example, the headset 100 may include a passive camera assembly (PCA) that generates color image data. The PCA may include one or more RGB cameras that capture images of some or all of the local area. In some embodiments, some or all of the imaging devices 130 of the DCA may also function as the PCA. The images captured by the PCA and the depth information determined by the DCA may be used to determine parameters of the local area, generate a model of the local area, update a model of the local area, or some combination thereof. The models of the local may be used to determine audio filters for spatialized audio content, such as audio filters that adjust for direct sound paths and reverberation within the local area. Furthermore, the position sensor 190 tracks the position (e.g., location and pose) of the headset 100 within the room. Additional details regarding the components of the headset 100 are discussed below in connection with FIG. 5.

Figure 1B:
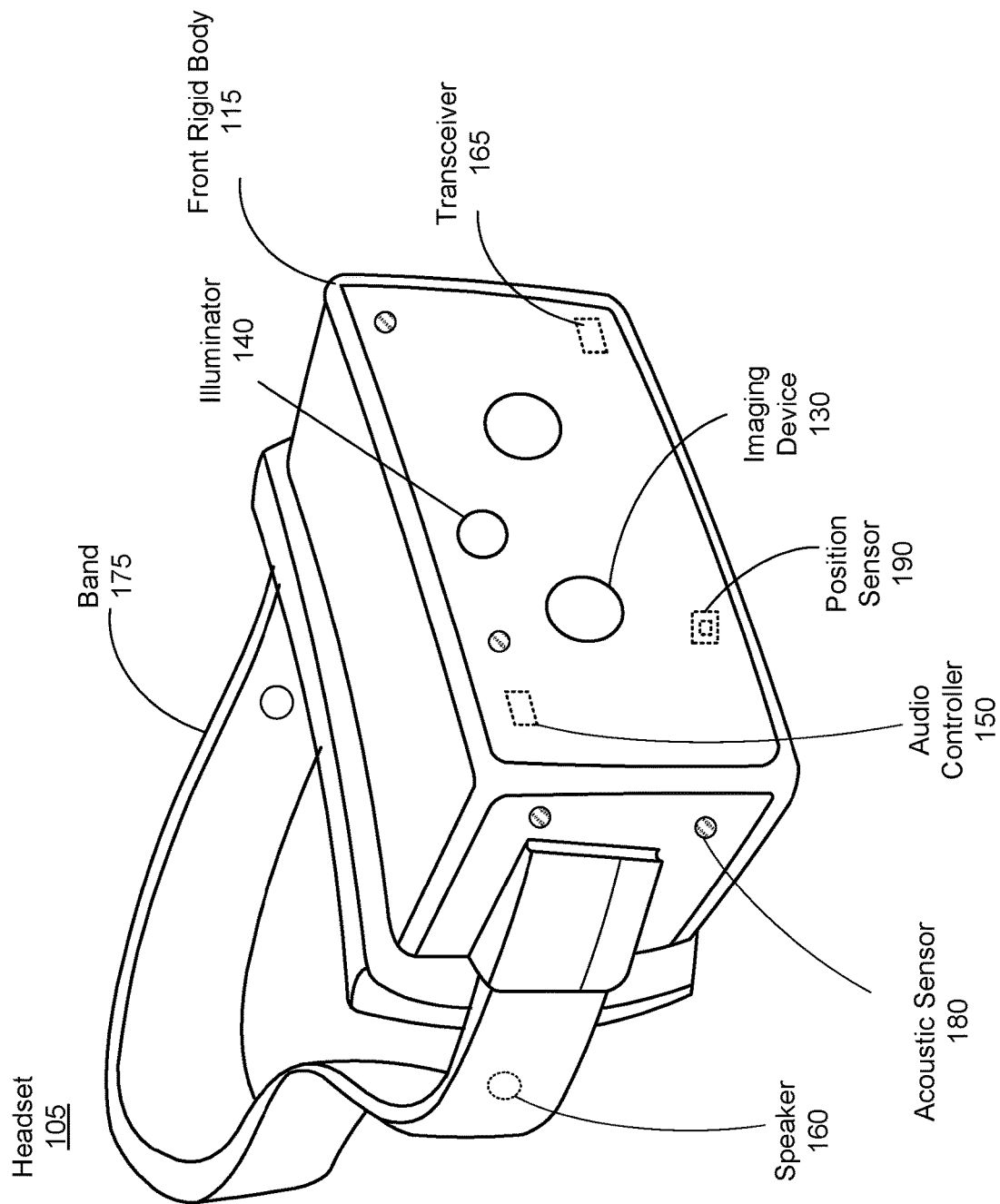
FIG. 1B is a perspective view of a headset implemented as a head-mounted display, in accordance with one or more embodiments.

FIG. 1B is a perspective view of a headset 105 implemented as a HMD, in accordance with one or more embodiments. In embodiments that describe an AR system and/or a MR system, portions of a front side of the HMD are at least partially transparent in the visible band (~380 nm to 750 nm), and portions of the HMD that are between the front side of the HMD and an eye of the user are at least partially transparent (e.g., a partially transparent electronic display). The HMD includes a front rigid body 115 and a band 175. The headset 105 includes many of the same components described above with reference to FIG. 1A, but modified to integrate with the HMD form factor. For example, the HMD includes a display assembly, a DCA, an audio system, and a position sensor 190. FIG. 1B shows the illuminator 140, a plurality of the speakers 160, a plurality of the imaging devices 130, a transceiver 165, a plurality of acoustic sensors 180, and the position sensor 190. The speakers 160 may be located in various locations, such as coupled to the band 175 (as shown), coupled to front rigid body 115, or may be configured to be inserted within the ear canal of a user.

Figure 2:
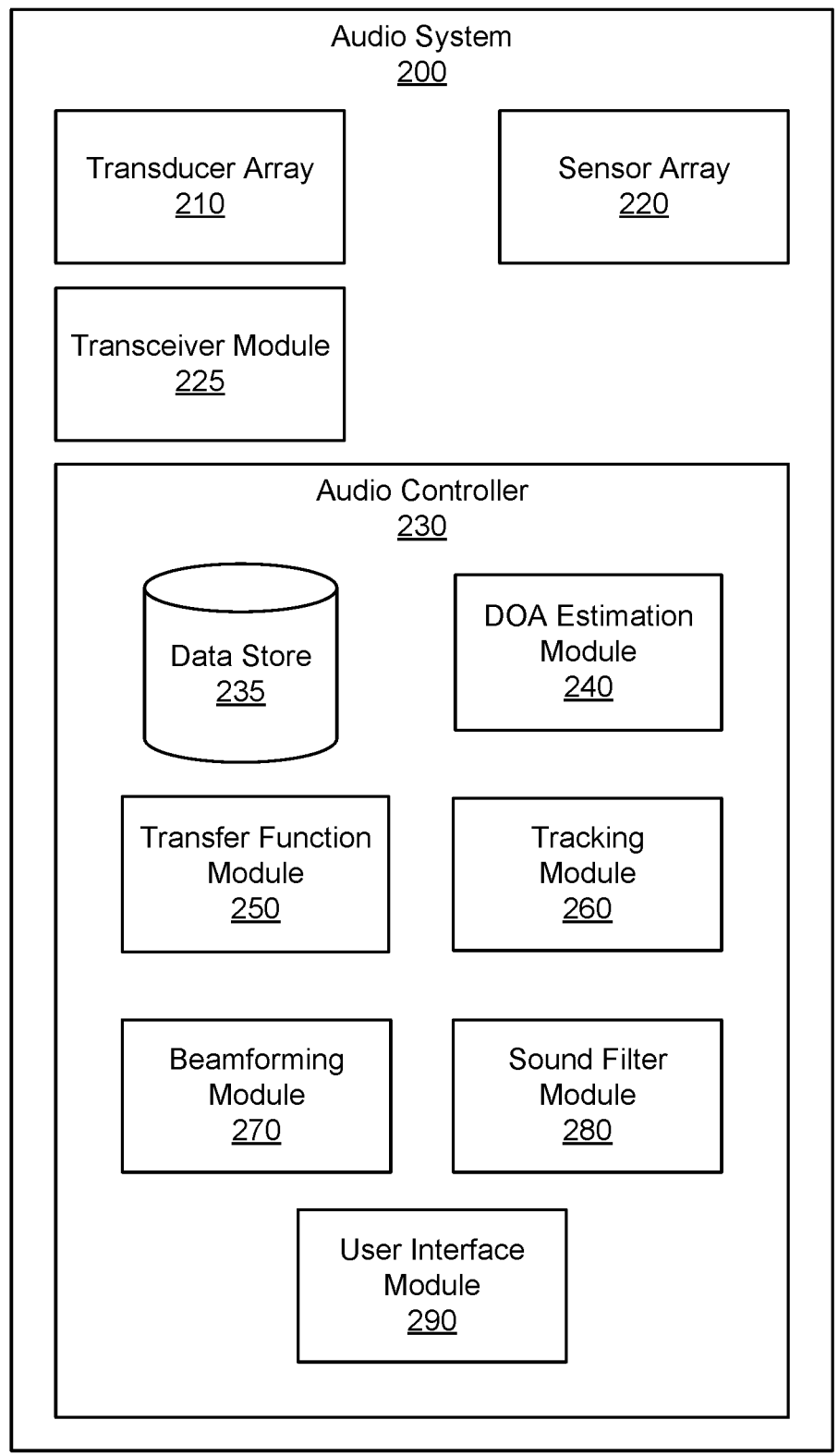
FIG. 2 is a block diagram of an audio system, in accordance with one or more embodiments.

FIG. 2 is a block diagram of an audio system 200, in accordance with one or more embodiments. The audio system in FIG. 1A or FIG. 1B may be an embodiment of the audio system 200. The audio system 200 provides an audio assembly for devices, such as for a headset as shown in FIG. 1A or FIG. 1B, or other types of devices. The audio system 200 generates one or more acoustic transfer functions for a user, such as an audio filter that selectively reduces or amplifies sounds. The audio system 200 may then use the one or more acoustic transfer functions to generate audio content for the user. In the embodiment of FIG. 2, the audio system 200 includes a transducer array 210, a sensor array 220, and an audio controller 230. Some embodiments of the audio system 200 have different components than those described here. Similarly, in some cases, functions can be distributed among the components in a different manner than is described here.

The transducer array 210 (also referred to as a speaker assembly) is configured to present audio content. The transducer array 210 includes a plurality of transducers. A transducer is a device that provides audio content. A transducer may be, e.g., a speaker (e.g., the speaker 160), a tissue transducer (e.g., the tissue transducer 170), some other device that provides audio content, or some combination thereof. A tissue transducer may be configured to function as a bone conduction transducer or a cartilage conduction transducer. The transducer array 210 may present audio content via air conduction (e.g., via one or more speakers), via bone conduction (via one or more bone conduction transducer), via cartilage conduction audio system (via one or more cartilage conduction transducers), or some combination thereof. In some embodiments, the transducer array 210 may include one or more transducers to cover different parts of a frequency range. For example, a piezoelectric transducer may be used to cover a first part of a frequency range and a moving coil transducer may be used to cover a second part of a frequency range.

The bone conduction transducers generate acoustic pressure waves by vibrating bone/tissue in the user's head. A bone conduction transducer may be coupled to a portion of a headset, and may be configured to be behind the auricle coupled to a portion of the user's skull. The bone conduction transducer receives vibration instructions from the audio controller 230, and vibrates a portion of the user's skull based on the received instructions. The vibrations from the bone conduction transducer generate a tissue-borne acoustic pressure wave that propagates toward the user's cochlea, bypassing the eardrum.

The cartilage conduction transducers generate acoustic pressure waves by vibrating one or more portions of the auricular cartilage of the ears of the user. A cartilage conduction transducer may be coupled to a portion of a headset, and may be configured to be coupled to one or more portions of the auricular cartilage of the ear. For example, the cartilage conduction transducer may couple to the back of an auricle of the ear of the user. The cartilage conduction transducer may be located anywhere along the auricular cartilage around the outer ear (e.g., the pinna, the tragus, some other portion of the auricular cartilage, or some combination thereof). Vibrating the one or more portions of auricular cartilage may generate: airborne acoustic pressure waves outside the ear canal; tissue born acoustic pressure waves that cause some portions of the ear canal to vibrate thereby generating an airborne acoustic pressure wave within the ear canal; or some combination thereof. The generated airborne acoustic pressure waves propagate down the ear canal toward the ear drum.

The transducer array 210 generates audio content in accordance with instructions from the audio controller 230. In some embodiments, the audio content is spatialized. Spatialized audio content is audio content that appears to originate from a particular direction and/or target region (e.g., an object in the local area and/or a virtual object). For example, spatialized audio content can make it appear that sound is originating from a virtual singer across a room from a user of the audio system 200. The transducer array 210 may be coupled to a wearable device (e.g., the headset 100 or the headset 105). In alternate embodiments, the transducer array 210 may be a plurality of speakers that are separate from the wearable device (e.g., coupled to an external console).

The sensor array 220 detects sounds within a local area surrounding the sensor array 220. The sensor array 220 may include a plurality of acoustic sensors that each detect air pressure variations of a sound wave and convert the detected sounds into an electronic format (analog or digital). The plurality of acoustic sensors may be positioned on a headset (e.g., headset 100 and/or the headset 105), on a user (e.g., in an ear canal of the user), on a neckband, or some combination thereof. An acoustic sensor may be, e.g., a microphone, a vibration sensor, an accelerometer, or any combination thereof. In some embodiments, the sensor array 220 is configured to monitor the audio content generated by the transducer array 210 using at least some of the plurality of acoustic sensors. Increasing the number of sensors may improve the accuracy of information (e.g., directionality) describing a sound field produced by the transducer array 210 and/or sound from the local area. The sensor array 220 may capture sounds from a wearer of a headset (e.g., speech which the headset can then re-broadcast as an audio signal), capture noises to characterize the local area (e.g., determine reverberation time, etc.), or capture noise to detect when a speech from another person is arriving at the headset.

The transceiver module 285 wirelessly communicates with other devices, such as other audio systems 200. For example, a user wearing a headset including the audio system 200 is in a local area with another user wearing another headset. The user's headset is referred to herein as the primary headset and the other user's headset is referred to herein as the remote headset. The transceiver modules 285 of the headsets may be connected to each other to transfer data, such as via a wireless connection. When the other user speaks into the remote headset, the sensor array 220 of the remote headset generates an audio signal by capturing sound made by the other user. The transceiver module 285 of the primary headset wirelessly receives the audio signal from the remote headset. The audio signal describes the sound made by the other user of the remote headset. The sound from the other user is also transmitted to the primary headset as a sound wave propagating through the local area. Because of different speeds of propagation, the sound arrives at the primary headset after the audio signal arrives at the primary headset via the wireless connection. This provides time to for the audio controller 230 of the primary headset to process the audio signal in a manner that either reduces the sound at the primary headset via destructive interference or amplifies the sound at the primary headset via constructive interference. In some embodiments, the wireless connection includes a secure connection and the audio signal is encrypted. The audio controller 230 of the remote headset encrypts the audio signal and the audio controller 230 of the primary headset decrypts the audio signal.

The audio controller 230 is a circuitry that controls operation of the audio system 200. In the embodiment of FIG. 2, the audio controller 230 includes a data store 235, a DOA estimation module 240, a transfer function module 250, a tracking module 260, a beamforming module 270, a sound filter module 280, and a user interface module 290. The audio controller 230 may be located inside a headset, in some embodiments. Some embodiments of the audio controller 230 have different components than those described here. Similarly, functions can be distributed among the components in different manners than described here. For example, some functions of the controller may be performed external to the headset. The user may opt in or opt out to allow the transmission of data captured by the headset to systems external to the headset (e.g., when the user is within a natural earshot of the person with another headset), and the user may select privacy settings controlling access to any such data.

The data store 235 stores data for use by the audio system 200. Data in the data store 235 may include audio signals received from other devices, audio filters for processing the audio signals, audio content generated by processing an audio signal with an audio filter, configuration settings for sound level reduction or sound level amplification, sounds recorded in the local area of the audio system 200, head-related transfer functions (HRTFs), transfer functions for one or more sensors, array transfer functions (ATFs) for one or more of the acoustic sensors, sound source locations, virtual model of local area, direction of arrival estimates, parameters (e.g., reverberation time) that describe the local area, and other data relevant for use by the audio system 200, or any combination thereof.

The user may opt-in to allow the data store 235 to record data captured by the audio system 200. In some embodiments, the audio system 200 may employ always on recording, in which the audio system 200 records all sounds captured by the audio system 200 in order to improve the experience for the user. The user may opt in or opt out to allow or prevent the audio system 200 from recording, storing, or transmitting the recorded data to other entities.

The DOA estimation module 240 is configured to localize sound sources in the local area based in part on information from the sensor array 220. Localization is a process of determining where sound sources are located relative to the user of the audio system 200. The DOA estimation module 240 performs a DOA analysis to localize one or more sound sources within the local area. The DOA analysis may include analyzing the intensity, spectra, and/or arrival time of each sound at the sensor array 220 to determine the direction from which the sounds originated. In some cases, the DOA analysis may include any suitable algorithm for analyzing a surrounding acoustic environment in which the audio system 200 is located.

For example, the DOA analysis may be designed to receive input signals from the sensor array 220 and apply digital signal processing algorithms to the input signals to estimate a direction of arrival. These algorithms may include, for example, delay and sum algorithms where the input signal is sampled, and the resulting weighted and delayed versions of the sampled signal are averaged together to determine a DOA. A least mean squared (LMS) algorithm may also be implemented to create an adaptive filter. This adaptive filter may then be used to identify differences in signal intensity, for example, or differences in time of arrival. These differences may then be used to estimate the DOA. In another embodiment, the DOA may be determined by converting the input signals into the frequency domain and selecting specific bins within the time-frequency (TF) domain to process. Each selected TF bin may be processed to determine whether that bin includes a portion of the audio spectrum with a direct path audio signal. Those bins having a portion of the direct-path signal may then be analyzed to identify the angle at which the sensor array 220 received the direct-path audio signal. The determined angle may then be used to identify the DOA for the received input signal. Other algorithms not listed above may also be used alone or in combination with the above algorithms to determine DOA.

In some embodiments, the DOA estimation module 240 may also determine the DOA with respect to an absolute position of the audio system 200 within the local area. The position of the sensor array 220 may be received from an external system (e.g., some other component of a headset, an artificial reality console, a mapping server, a position sensor (e.g., the position sensor 190), etc.). The external system may create a virtual model of the local area, in which the local area and the position of the audio system 200 are mapped. The received position information may include a location and/or an orientation of some or all of the audio system 200 (e.g., of the sensor array 220). The DOA estimation module 240 may update the estimated DOA based on the received position information.

The transfer function module 250 is configured to generate one or more acoustic transfer functions. Generally, a transfer function is a mathematical function giving a corresponding output value for each possible input value. Based on parameters of the detected sounds, the transfer function module 250 generates one or more acoustic transfer functions associated with the audio system. The acoustic transfer functions may be array transfer functions (ATFs), head-related transfer functions (HRTFs), other types of acoustic transfer functions, or some combination thereof. An ATF characterizes how the microphone receives a sound from a point in space.

An ATF includes a number of transfer functions that characterize a relationship between the sound source and the corresponding sound received by the acoustic sensors in the sensor array 220. Accordingly, for a sound source there is a corresponding transfer function for each of the acoustic sensors in the sensor array 220. And collectively the set of transfer functions is referred to as an ATF. Accordingly, for each sound source there is a corresponding ATF. Note that the sound source may be, e.g., someone or something generating sound in the local area, the user, or one or more transducers of the transducer array 210. The ATF for a particular sound source location relative to the sensor array 220 may differ from user to user due to a person's anatomy (e.g., ear shape, shoulders, etc.) that affects the sound as it travels to the person's ears. Accordingly, the ATFs of the sensor array 220 are personalized for each user of the audio system 200.

In some embodiments, the transfer function module 250 determines one or more HRTFs for a user of the audio system 200. The HRTF characterizes how an ear receives a sound from a point in space. The HRTF for a particular source location relative to a person is unique to each ear of the person (and is unique to the person) due to the person's anatomy (e.g., ear shape, shoulders, etc.) that affects the sound as it travels to the person's ears. In some embodiments, the transfer function module 250 may determine HRTFs for the user using a calibration process. In some embodiments, the transfer function module 250 may provide information about the user to a remote system. The user may adjust privacy settings to allow or prevent the transfer function module 250 from providing the information about the user to any remote systems. The remote system determines a set of HRTFs that are customized to the user using, e.g., machine learning, and provides the customized set of HRTFs to the audio system 200.

The tracking module 260 is configured to track locations of one or more sound sources. The tracking module 260 may compare current DOA estimates and compare them with a stored history of previous DOA estimates. In some embodiments, the audio system 200 may recalculate DOA estimates on a periodic schedule, such as once per second, or once per millisecond. The tracking module may compare the current DOA estimates with previous DOA estimates, and in response to a change in a DOA estimate for a sound source, the tracking module 260 may determine that the sound source moved. In some embodiments, the tracking module 260 may detect a change in location based on visual information received from the headset or some other external source. The tracking module 260 may track the movement of one or more sound sources over time. The tracking module 260 may store values for a number of sound sources and a location of each sound source at each point in time. In response to a change in a value of the number or locations of the sound sources, the tracking module 260 may determine that a sound source moved. The tracking module 260 may calculate an estimate of the localization variance. The localization variance may be used as a confidence level for each determination of a change in movement.

The beamforming module 270 is configured to process one or more ATFs to selectively emphasize sounds from sound sources within a certain area while de-emphasizing sounds from other areas. In analyzing sounds detected by the sensor array 220, the beamforming module 270 may combine information from different acoustic sensors to emphasize sound associated from a particular region of the local area while deemphasizing sound that is from outside of the region. The beamforming module 270 may isolate an audio signal associated with sound from a particular sound source from other sound sources in the local area based on, e.g., different DOA estimates from the DOA estimation module 240 and the tracking module 260. The beamforming module 270 may thus selectively analyze discrete sound sources in the local area. In some embodiments, the beamforming module 270 may enhance a signal from a sound source. For example, the beamforming module 270 may apply sound filters which eliminate signals above, below, or between certain frequencies. Signal enhancement acts to enhance sounds associated with a given identified sound source relative to other sounds detected by the sensor array 220. In some embodiments, the beamforming module 270 may apply a beamforming directed at the other user (e.g., toward the other user's mouth) to isolate sound made by the other user from other sounds in the local area captured by the sensor array 220. The beamformed signal is then transmitted from the other headset to the sound level control module 290 of the headset.

The sound filter module 280 facilitates sound level reduction or sound level amplification for sounds made by other users wearing headsets (or similar devices capable of recording sounds and transmitting audio signals). The sound filter module 280 determines an audio filter to selectively adjust an amplitude of the sound. The audio filter when applied to the audio signal from the transceiver module 225 models a change in the sound caused by propagation from the remote headset to the speaker assembly of the primary headset. The tracking module 260 may track the location of the remote headset and the location and orientation of the primary headset to facilitate creation of the audio filter. In particular, the audio filter models a change in sound caused by propagation to each of the speakers (or ears).

In some embodiments, the sound filter module 280 facilitates sound level equalization. For example, certain frequency bands may be reduced or amplified to produce sound that combines constructively or destructively with the sound for selected parts of the spectrum in the audio signal.

The audio filter may include, for each speaker, a transformation that accounts for a direct sound path and reverberation. The direct sound path may be determined based on simulation of sound propagation from the source to the destination. For each speaker, the audio filter may include a gain, time delay, and frequency response to model the effect of direct path sound propagation from the sound source to the speaker. The reverberation may be modeled by a room impulse response or reverberation time associated with the local area, which may be determined based on room parameters (e.g., dimensions of room).

The sound filter module 280 applies the audio filter to the audio signal to generate audio content. In one example, the speaker assembly includes multiple (e.g., left and right) speakers, such as the transducer array 210. The audio filter models a change in sound caused by propagation from the other headset to each of the speakers to generate an audio channel for each of the speakers. The audio content is spatialized such that if presented via the multiple speakers, the sound would appear to originate from the direction of the remote headset. In some embodiments, the sound filter module 280 generates a spectral masking signal based on the room impulse response or reverberation time to account for the portion of the sound from the user caused by reverberation, and combines the spectral masking signal with a direct path signal that accounts for the portion of the sound caused by direct path sound propagation.

To provide sound level reduction for the sound made by the other user of the remote headset, the audio filter includes an inverter to invert the phase of the audio signal. To provide sound level amplification for the sound made by the other user of the remote headset, the audio filter does not invert the audio signal. The audio filter may further include a gain to control the level of the audio signal, and thereby control the amount of sound level reduction or amplification.

The sound filter module 280 presents the audio content to the user of the primary headset such that the presented audio content combines with the sound from the user of the remote headset to selectively adjust the amplitude of the sound. The sound filter module 280 processes the audio signal to generate the audio content and presents the audio content to the user at the same time as the sound from the other user arrives. To provide sound level reduction, the phase of the audio content is inverted and presented by the speaker assembly to destructively interfere with the sound made by the other user. To provide sound level amplification, the audio content is presented by the speaker assembly to constructively interfere with the sound.

The sound filter module 280 determines and/or applies sound filters for the transducer array 210. In some embodiments, the sound filters cause the audio content to be spatialized, such that the audio content appears to originate from a target region. The sound filter module 280 may use HRTFs and/or acoustic parameters to generate the sound filters. The acoustic parameters describe acoustic properties of the local area. The acoustic parameters may include, e.g., a reverberation time, a reverberation level, a room impulse response, etc. In some embodiments, the sound filter module 280 calculates one or more of the acoustic parameters. In some embodiments, the sound filter module 280 requests the acoustic parameters from a mapping server (e.g., as described below with regard to FIG. 5).

In some embodiments, the sound filter module 280 provides the sound filters to the transducer array 210. In some embodiments, the sound filters may cause positive or negative amplification of sounds as a function of frequency.

The user interface module 290 provides a user interface for generating configuration settings for sound level reduction or sound level amplification. For each sound source, a configuration setting may define whether to provide reduction or amplification, the amount of sound level reduction or amplification, etc. As such, sound sources in the local area can be selectively reduced or amplified to enhance hearing ability for the user of the headset. The configuration settings may include user instructions provided via user input or may be determined programmatically from sensor data. For example, a user may face a sound source to focus on the sound from the sound source. Based on sensor data indicating the orientation of the user as being directed at the sound source, the sound source may be amplified while one or more other sound sources may be reduced.

Figure 3:
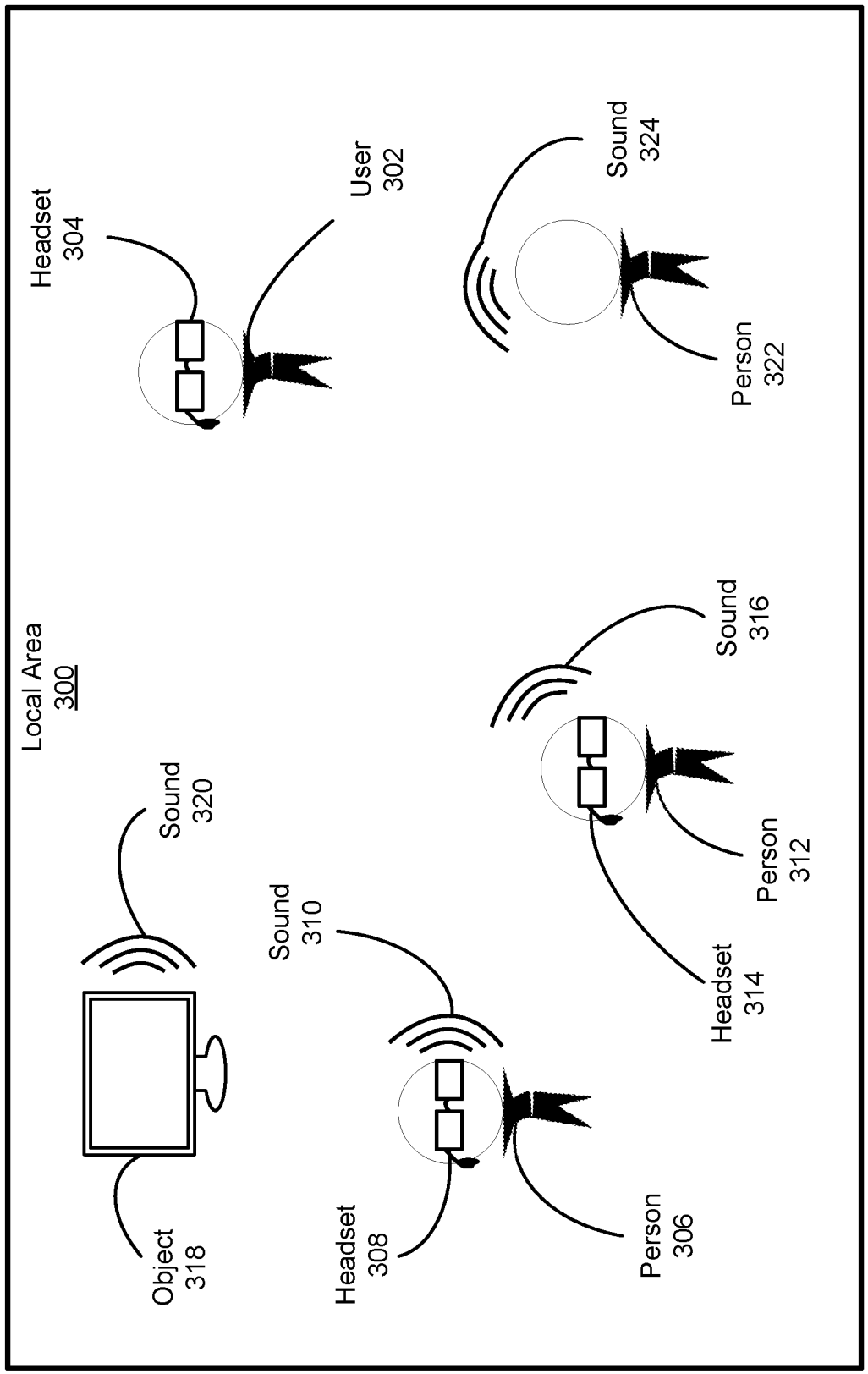
FIG. 3 shows a local area including sound sources, in accordance with one or more embodiments.

FIG. 3 shows a local area 300 including sound sources, in accordance with one or more embodiments. The local area 300 includes a user 302 wearing a headset 304 that receives sound from various sound sources. For example, the user receives sound 310 from a person 306 wearing a headset 308, sound 316 from a person 312 wearing a headset 314, sound 320 from an object 318, and sound 324 from a person 222 that is not wearing a headset. The headsets 304, 308, and 312 may each include an audio system 200. In this example, the headset 304 is the primary headset and the headsets 308 and 314 are secondary headsets.

The headsets 308 and 314 may each provide audio signals to the headset 304 (e.g., via wireless connection), which arrive at the headset 304 prior to the sounds 310 and 316. The headset 304 may selectively amplify or reduce each of the sounds 310 and 316 by presenting audio content. In one example, the sound 310 from the person 306 is reduced at the headset 304 based on the audio content providing sound that destructively interferes with the sound 310. The sound 316 from the person 312 is amplified at the headset 304 based on the audio content providing sound that constructively interferes with the sound 316. In some embodiments, sound from external sound sources without a headset are not affected.

In some embodiments, active noise control may be provided for the sound 320 from the object 318 (e.g., a television) or the sound 324 from the person 322. The object 318 and person 322 do not include a headset (or similar device) to provide the audio signal to the headset 304. As such, the sound level reduction or amplification may be performed by detecting the sounds 320 or 324 by the sensor array of the headset 304, generating audio signals from the sounds 320 or 324, and filtering the audio signals.

In some embodiments, the headsets 304, 308, and 314 share audio signals based on being part of a group. For example, the users of the headsets may opt in via a user interface. In another example, the users may be connected on a social graph of an online social networking system.

FIG. 4 is a flowchart illustrating a process 400 for adjusting an amplitude of sound, in accordance with one or more embodiments. The process shown in FIG. 4 may be performed by components of an audio assembly (e.g., audio system 200). Other entities may perform some or all of the steps in FIG. 4 in other embodiments. Embodiments may include different and/or additional steps, or perform the steps in different orders.

A first audio assembly receives 410 an audio signal from a second audio assembly via a wireless connection. The first audio assembly may be a headset worn by a first user and the second audio assembly may be a second headset worn by a second user. Here, the first audio assembly is a primary headset and the second audio assembly is a remote headset. Both the first and second audio assemblies are in a local area. The audio signal is an electronic signal that describes a sound made by the second user of the second audio assembly. The second audio assembly captures the sound and generates the audio signal when the user speaks. In some embodiments, the second audio assembly applies a beamforming to the audio signal to isolate the voice of the second user from other sounds in the local area. The audio signal arrives at the first audio assembly via the wireless connection prior to the sound via sound wave propagation in the local area.

The first audio assembly determines 420 an audio filter to selectively adjust an amplitude of the sound. The audio filter models a change in the sound caused by propagation from the second audio assembly to a speaker assembly of the first audio system. The audio filter may be determined based on the location of the second audio assembly and the location and orientation of the first audio assembly. In some embodiments, sensor data generated by sensors in the headset may be used to determine and track over time the locations and orientation. For example, the sensor data may include color image data from a passive camera of the headset indicating the location of the second audio assembly, depth image data from a depth camera of the headset indicating the location of the second audio assembly, or a measurement signal from a position sensor of the headset indicating the location or the orientation of the first audio assembly.

The audio filter may include, for each speaker of the speaker assembly, a gain, time delay, and frequency response to model a direct sound path from the sound source to the speaker. In some embodiments, the audio filter may further include a model of reverberation, which may include a room impulse response or a reverberation time. The room impulse response or reverberation time may be determined based on room parameters of the local area, such as the dimensions of a room, the surface materials of the room, etc. The room parameters may be used to simulate sound propagation within the local area to determine the room impulse response or reverberation time. In another example, the room parameters may be provided to a mapping server, and the mapping server provides the room impulse response or reverberation time to the first audio assembly.

The first audio assembly electively reduces or amplifies the sound level of the sound. To reduce the sound, the audio filter includes an inverter to invert the phase of the audio signal. The audio filter may further include a gain to control the level of the audio content, and thereby control the amount of sound level reduction or amplification. The first audio assembly may determine the desired amplitude of the sound based on configuration settings. The configuration settings may include user instructions provided via user input or may be determined programmatically from sensor data. The first audio assembly may be connected to multiple other audio assemblies. The configuration setting may define whether to provide reduction or amplification, the amount of sound level reduction or amplification, etc. for each of the other audio assemblies.

In some embodiments, the audio filter provides for sound level equalization. For example, different frequency bands may be reduced or amplified to produce sound that combines constructively or destructively with the sound for selected parts of the spectrum in the audio signal.

In some embodiments, the first audio assembly determines the audio filter based on distance, orientation, or pose between the first audio assembly (e.g., primary headset) and the second audio assembly (e.g., secondary headset). This information is useful to update the filter dynamically as users keep moving and the scene changes.

The first audio assembly applies 430 the audio filter to the audio signal to generate audio content. The audio content generated from application of the audio filter to the audio signal may include an audio channel for each speaker of a speaker assembly of the first audio assembly. The speaker assembly may include two or more channels, such as a transducer array. The audio channels are spatialized such that sound generated from the speaker assembly using the audio channels destructively or constructively interfere with the sound that originates from the second user.

The first audio assembly presents 440, via the speaker assembly of the first audio assembly, the audio content to the user of the first audio assembly such that the presented audio content combines with the sound to selectively adjust the amplitude of the sound. The first audio assembly may time the presentation of the audio content to coincide with arrival of the sound from the other user via propagation in the local area. To provide sound level reduction, the audio content presented by the speaker assembly destructively interferes with the sound made by the other user. To provide sound level amplification, the audio content presented by the speaker assembly constructively interferes with the sound.

The process 400 may be repeated as the user or other user moves within the local area. The first audio assembly adjusts the audio filter based on changes in the location of the second audio assembly, location of the first audio assembly, or orientation of the first audio assembly. As such, the audio filter may be updated in real time to update and account for changing positions and orientation. Sensor data captured by the headset (e.g., position sensor 540, DCA 545, etc.) is used to predict relative positions and orientations in advance and predict the audio filter. The audio filter is further refined while both sound source and the first audio assembly are static.

In some embodiments, audio filters or beamforming filters may be updated in real time based on relative distance between the sound source and the first audio assembly. The further they are apart, the longer the processing time that is available to complete the operations. The performance of the beamforming or audio filtering for sound level adjustment may adjust depending on the distance or available processing time, such as by using shorter filters for shorter distances or longer filters for longer distances. For example, sound that has traveled further has less high frequency energy, which should be accounted for if attempting to cancel it. Also, sound that has traveled further most likely has a lower direct to reverberant energy ratio, so dereverberation or other accounting for the room reflections may be necessary. With more available processing time, a more complicated (longer) filter may be generated and used, so more possibilities for the audio filter are available than when a correction must be performed extremely quickly.

The process 400 may also be performed for multiple other audio assemblies and users in the local area simultaneously to selectively reduce or amplify sounds made by the users. The sound level from some users may be reduced or muted while the sound level from other users may be amplified.

Figure 5:
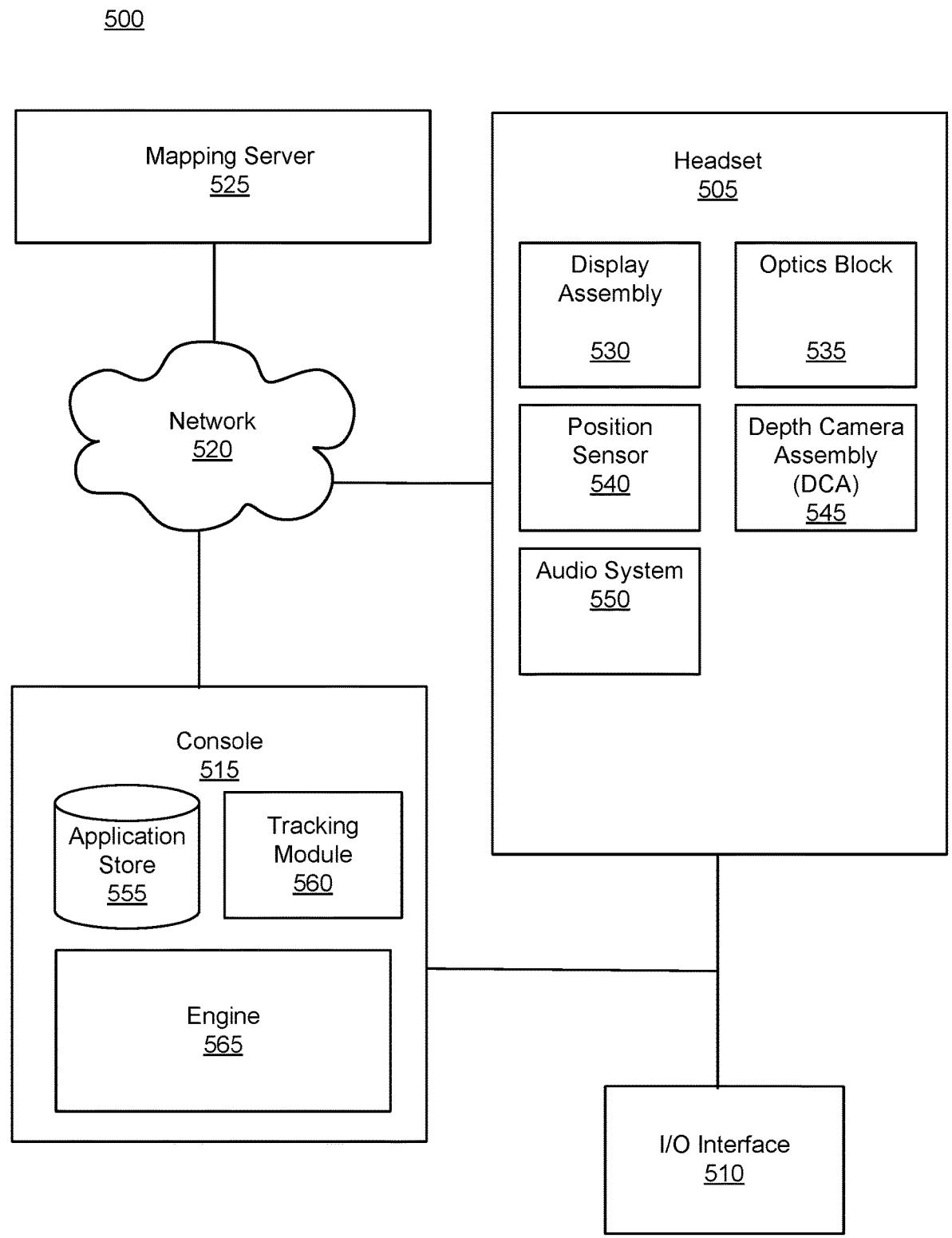
FIG. 5 is a system that includes a headset, in accordance with one or more embodiments.

FIG. 5 is a system 500 that includes a headset 505, in accordance with one or more embodiments. In some embodiments, the headset 505 may be the headset 100 of FIG. 1A or the headset 105 of FIG. 1B. The system 500 may operate in an artificial reality environment (e.g., a virtual reality environment, an augmented reality environment, a mixed reality environment, or some combination thereof). The system 500 shown by FIG. 5 includes the headset 505, an input/output (I/O) interface 510 that is coupled to a console 515, the network 520, and the mapping server 525. While FIG. 5 shows an example system 500 including one headset 505 and one I/O interface 510, in other embodiments any number of these components may be included in the system 500. For example, there may be multiple headsets each having an associated I/O interface 510, with each headset and I/O interface 510 communicating with the console 515. In alternative configurations, different and/or additional components may be included in the system 500. Additionally, functionality described in conjunction with one or more of the components shown in FIG. 5 may be distributed among the components in a different manner than described in conjunction with FIG. 5 in some embodiments. For example, some or all of the functionality of the console 515 may be provided by the headset 505.

The headset 505 includes the display assembly 530, an optics block 535, one or more position sensors 540, and the DCA 545. Some embodiments of headset 505 have different components than those described in conjunction with FIG. 5. Additionally, the functionality provided by various components described in conjunction with FIG. 5 may be differently distributed among the components of the headset 505 in other embodiments, or be captured in separate assemblies remote from the headset 505.

The display assembly 530 displays content to the user in accordance with data received from the console 515. The display assembly 530 displays the content using one or more display elements (e.g., the display elements 120). A display element may be, e.g., an electronic display. In various embodiments, the display assembly 530 comprises a single display element or multiple display elements (e.g., a display for each eye of a user). Examples of an electronic display include: a liquid crystal display (LCD), an organic light emitting diode (OLED) display, an active-matrix organic light-emitting diode display (AMOLED), a waveguide display, some other display, or some combination thereof. Note in some embodiments, the display element 120 may also include some or all of the functionality of the optics block 535.

The optics block 535 may magnify image light received from the electronic display, corrects optical errors associated with the image light, and presents the corrected image light to one or both eyeboxes of the headset 505. In various embodiments, the optics block 535 includes one or more optical elements. Example optical elements included in the optics block 535 include: an aperture, a Fresnel lens, a convex lens, a concave lens, a filter, a reflecting surface, or any other suitable optical element that affects image light. Moreover, the optics block 535 may include combinations of different optical elements. In some embodiments, one or more of the optical elements in the optics block 535 may have one or more coatings, such as partially reflective or anti-reflective coatings.

Magnification and focusing of the image light by the optics block 535 allows the electronic display to be physically smaller, weigh less, and consume less power than larger displays. Additionally, magnification may increase the field of view of the content presented by the electronic display. For example, the field of view of the displayed content is such that the displayed content is presented using almost all (e.g., approximately 110 degrees diagonal), and in some cases, all of the user's field of view. Additionally, in some embodiments, the amount of magnification may be adjusted by adding or removing optical elements.

In some embodiments, the optics block 535 may be designed to correct one or more types of optical error. Examples of optical error include barrel or pincushion distortion, longitudinal chromatic aberrations, or transverse chromatic aberrations. Other types of optical errors may further include spherical aberrations, chromatic aberrations, or errors due to the lens field curvature, astigmatisms, or any other type of optical error. In some embodiments, content provided to the electronic display for display is pre-distorted, and the optics block 535 corrects the distortion when it receives image light from the electronic display generated based on the content.

The position sensor 540 is an electronic device that generates data indicating a position of the headset 505. The position sensor 540 generates one or more measurement signals in response to motion of the headset 505. The position sensor 190 is an embodiment of the position sensor 540. Examples of a position sensor 540 include: one or more IMUs, one or more accelerometers, one or more gyroscopes, one or more magnetometers, another suitable type of sensor that detects motion, or some combination thereof. The position sensor 540 may include multiple accelerometers to measure translational motion (forward/back, up/down, left/right) and multiple gyroscopes to measure rotational motion (e.g., pitch, yaw, roll). In some embodiments, an IMU rapidly samples the measurement signals and calculates the estimated position of the headset 505 from the sampled data. For example, the IMU integrates the measurement signals received from the accelerometers over time to estimate a velocity vector and integrates the velocity vector over time to determine an estimated position of a reference point on the headset 505. The reference point is a point that may be used to describe the position of the headset 505. While the reference point may generally be defined as a point in space, however, in practice the reference point is defined as a point within the headset 505.

The DCA 545 generates depth information for a portion of the local area. The DCA includes one or more imaging devices and a DCA controller. The DCA 545 may also include an illuminator. Operation and structure of the DCA 545 is described above with regard to FIG. 1A.

The audio system 550 provides audio content to a user of the headset 505. The audio system 550 also provides for selective sound level amplification or reduction. The audio system 550 is substantially the same as the audio system 200 describe above. The audio system 550 may comprise one or acoustic sensors, one or more transducers, and an audio controller. The audio system 550 may provide spatialized audio content to the user. In some embodiments, the audio system 550 may request acoustic parameters from the mapping server 525 over the network 520. The acoustic parameters describe one or more acoustic properties (e.g., room impulse response, a reverberation time, a reverberation level, etc.) of the local area. The audio system 550 may provide information describing at least a portion of the local area from e.g., the DCA 545 and/or location information for the headset 505 from the position sensor 540. The audio system 550 may generate one or more sound filters using one or more of the acoustic parameters received from the mapping server 525, and use the sound filters to provide audio content to the user.

The I/O interface 510 is a device that allows a user to send action requests and receive responses from the console 515. An action request is a request to perform a particular action. For example, an action request may be an instruction to start or end capture of image or video data, or an instruction to perform a particular action within an application. The I/O interface 510 may include one or more input devices. Example input devices include: a keyboard, a mouse, a game controller, or any other suitable device for receiving action requests and communicating the action requests to the console 515. An action request received by the I/O interface 510 is communicated to the console 515, which performs an action corresponding to the action request. In some embodiments, the I/O interface 510 includes an IMU that captures calibration data indicating an estimated position of the I/O interface 510 relative to an initial position of the I/O interface 510. In some embodiments, the I/O interface 510 may provide haptic feedback to the user in accordance with instructions received from the console 515. For example, haptic feedback is provided when an action request is received, or the console 515 communicates instructions to the I/O interface 510 causing the I/O interface 510 to generate haptic feedback when the console 515 performs an action.

The console 515 provides content to the headset 505 for processing in accordance with information received from one or more of: the DCA 545, the headset 505, and the I/O interface 510. In the example shown in FIG. 5, the console 515 includes an application store 555, a tracking module 560, and an engine 565. Some embodiments of the console 515 have different modules or components than those described in conjunction with FIG. 5. Similarly, the functions further described below may be distributed among components of the console 515 in a different manner than described in conjunction with FIG. 5. In some embodiments, the functionality discussed herein with respect to the console 515 may be implemented in the headset 505, or a remote system.

The application store 555 stores one or more applications for execution by the console 515. An application is a group of instructions, that when executed by a processor, generates content for presentation to the user. Content generated by an application may be in response to inputs received from the user via movement of the headset 505 or the I/O interface 510. Examples of applications include: gaming applications, conferencing applications, video playback applications, or other suitable applications.

The tracking module 560 tracks movements of the headset 505 or of the I/O interface 510 using information from the DCA 545, the one or more position sensors 540, or some combination thereof. For example, the tracking module 560 determines a position of a reference point of the headset 505 in a mapping of a local area based on information from the headset 505. The tracking module 560 may also determine positions of an object or virtual object. Additionally, in some embodiments, the tracking module 560 may use portions of data indicating a position of the headset 505 from the position sensor 540 as well as representations of the local area from the DCA 545 to predict a future location of the headset 505. The tracking module 560 provides the estimated or predicted future position of the headset 505 or the I/O interface 510 to the engine 565.

The engine 565 executes applications and receives position information, acceleration information, velocity information, predicted future positions, or some combination thereof, of the headset 505 from the tracking module 560. Based on the received information, the engine 565 determines content to provide to the headset 505 for presentation to the user. For example, if the received information indicates that the user has looked to the left, the engine 565 generates content for the headset 505 that mirrors the user's movement in a virtual local area or in a local area augmenting the local area with additional content. Additionally, the engine 565 performs an action within an application executing on the console 515 in response to an action request received from the I/O interface 510 and provides feedback to the user that the action was performed. The provided feedback may be visual or audible feedback via the headset 505 or haptic feedback via the I/O interface 510.

The network 520 couples the headset 505 and/or the console 515 to the mapping server 525. In some embodiments, the network 520 may couple the headset 505 to other headsets for wireless communication of audio signals. The network 520 may include any combination of local area and/or wide area networks using both wireless and/or wired communication systems. For example, the network 520 may include the Internet, as well as mobile telephone networks. In one embodiment, the network 520 uses standard communications technologies and/or protocols. Hence, the network 520 may include links using technologies such as Ethernet, 802.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on the network 520 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 520 can be represented using technologies and/or formats including image data in binary form (e.g. Portable Network Graphics (PNG)), hypertext markup language (HTML), extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc.

The mapping server 525 may include a database that stores a virtual model describing a plurality of spaces, wherein one location in the virtual model corresponds to a current configuration of a local area of the headset 505. The mapping server 525 receives, from the headset 505 via the network 520, information describing at least a portion of the local area and/or location information for the local area. The user may adjust privacy settings to allow or prevent the headset 505 from transmitting information to the mapping server 525. The mapping server 525 determines, based on the received information and/or location information, a location in the virtual model that is associated with the local area of the headset 505. The mapping server 525 determines (e.g., retrieves) one or more acoustic parameters associated with the local area, based in part on the determined location in the virtual model and any acoustic parameters associated with the determined location. The mapping server 525 may transmit the location of the local area and any values of acoustic parameters associated with the local area to the headset 505.

One or more components of system 500 may contain a privacy module that stores one or more privacy settings for user data elements. The user data elements describe the user or the headset 505. For example, the user data elements may describe a physical characteristic of the user, an action performed by the user, a location of the user of the headset 505, a location of the headset 505, an HRTF for the user, etc. Privacy settings (or "access settings") for a user data element may be stored in any suitable manner, such as, for example, in association with the user data element, in an index on an authorization server, in another suitable manner, or any suitable combination thereof.

A privacy setting for a user data element specifies how the user data element (or particular information associated with the user data element) can be accessed, stored, or otherwise used (e.g., viewed, shared, modified, copied, executed, surfaced, or identified). In some embodiments, the privacy settings for a user data element may specify a "blocked list" of entities that may not access certain information associated with the user data element. The privacy settings associated with the user data element may specify any suitable granularity of permitted access or denial of access. For example, some entities may have permission to see that a specific user data element exists, some entities may have permission to view the content of the specific user data element, and some entities may have permission to modify the specific user data element. The privacy settings may allow the user to allow other entities to access or store user data elements for a finite period of time.

The privacy settings may allow a user to specify one or more geographic locations from which user data elements can be accessed. Access or denial of access to the user data elements may depend on the geographic location of an entity who is attempting to access the user data elements. For example, the user may allow access to a user data element and specify that the user data element is accessible to an entity only while the user is in a particular location. If the user leaves the particular location, the user data element may no longer be accessible to the entity. As another example, the user may specify that a user data element is accessible only to entities within a threshold distance from the user, such as another user of a headset within the same local area as the user. If the user subsequently changes location, the entity with access to the user data element may lose access, while a new group of entities may gain access as they come within the threshold distance of the user.

The system 500 may include one or more authorization/privacy servers for enforcing privacy settings. A request from an entity for a particular user data element may identify the entity associated with the request and the user data element may be sent only to the entity if the authorization server determines that the entity is authorized to access the user data element based on the privacy settings associated with the user data element. If the requesting entity is not authorized to access the user data element, the authorization server may prevent the requested user data element from being retrieved or may prevent the requested user data element from being sent to the entity. Although this disclosure describes enforcing privacy settings in a particular manner, this disclosure contemplates enforcing privacy settings in any suitable manner.

Additional Configuration Information

The foregoing description of the embodiments has been presented for illustration; it is not intended to be exhaustive or to limit the patent rights to the precise forms disclosed. Persons skilled in the relevant art can appreciate that many modifications and variations are possible considering the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising, by a first audio assembly:
   receiving an audio signal from a second audio assembly via a wireless connection with the second audio assembly, the audio signal describing a sound made by a user of the second audio assembly, wherein the audio signal arrives at the first audio assembly prior to the sound;
   determining an audio filter to selectively adjust an amplitude of the sound;
   applying the audio filter to the audio signal to generate audio content;
   presenting, via a speaker assembly of the first audio assembly, the audio content to a user of the first audio assembly such that the presented audio content combines with the sound to selectively adjust the amplitude of the sound;
   determining, using one or more sensors, a change in at least one of a location of the first audio assembly or a location of the second audio assembly; and
   adjusting the audio filter based on the change.

2. The method of claim 1, wherein the audio filter models a change in the sound caused by propagation from the second audio assembly to each speaker of the speaker assembly.

3. The method of claim 1, wherein:
   the audio filter inverts a phase of the audio signal; and
   the presented audio content destructively interferes with the sound to decrease the amplitude of the sound.

4. The method of claim 1, wherein the presented audio signal constructively interferes with the sound to increase the amplitude of the sound.

5. The method of claim 1, further comprising, by the first audio assembly, receiving user instructions defining the amplitude of the sound, and wherein the audio filter is determined based on the user instructions.

6. The method of claim 1, wherein:
   the audio filter models a direct sound path from the second audio assembly to the speaker assembly;
   the audio filter further models reverberation paths from the second audio assembly to the speaker assembly;
   the reverberation paths are based on room parameters defining dimensions of a room.

7. The method of claim 1, further comprising, by the first audio assembly:
   determining, based on the one or more sensors, a second change in an orientation of the first audio assembly; and
   adjusting the audio filter based on the second change.

8. The method of claim 1, wherein the audio signal is encrypted when received from the second audio assembly and the method further comprises, by the first audio assembly, decrypting the audio signal prior to applying the audio filter to the audio signal.

9. The method of claim 1, wherein the audio signal is a beamformed signal captured by a sensor array of the second audio assembly, the beamformed signal isolating the sound made by the user from other sounds captured by the sensor array.

10. The method of claim 1, further comprising, by the first audio assembly:
    determining an available processing time based on a distance between the second audio assembly and the first audio assembly; and
    adjusting the audio filter based on the available processing time.

11. The method of claim 1, wherein the presented audio signal one of constructively interferes or destructively interferes with a frequency band of the sound.

12. A computing device, comprising:
a speaker assembly;
one or more sensors configured to generate data indicating a location of the computing device or a location of a second computing device; and
a controller configured to:
receive an audio signal from the second computing device via a wireless connection with the computing device, the audio signal describing a sound made by a user of the second computing device, wherein the audio signal arrives at the computing device prior to the sound;
determine an audio filter to selectively adjust an amplitude of the sound;
apply the audio filter to the audio signal to generate audio content;
present, via the speaker assembly, the audio content to a user such that the presented audio content combines with the sound to selectively adjust the amplitude of the sound;
determine, using the data from the one or more sensors, a change in at least one of the location of the computing device or the location of the second computing device; and
adjust the audio filter based on the change.

13. The computing device of claim 12, wherein the audio filter models a change in the sound caused by propagation from the second computing device to each speaker of the speaker assembly.

14. The computing device of claim 12, wherein:
the audio filter inverts a phase of the audio signal; and
the presented audio content destructively interferes with the sound to decrease the amplitude of the sound.

15. The computing device of claim 12, wherein the presented audio signal constructively interferes with the sound to increase the amplitude of the sound.

16. The computing device of claim 12, wherein the controller is further configured to receive user instructions defining the amplitude of the sound, and wherein the audio filter is determined based on the user instructions.

17. The computing device of claim 12, wherein the controller is further configured to:
determine, based on second data from the one or more sensors, a second change in an orientation of the first computing device; and
adjust the audio filter based on the second change.

18. The computing device of claim 12, wherein the audio signal is a beamformed signal captured by a sensor array of the second computing device, the beamformed signal isolating the sound made by the user from other sounds captured by the sensor array.

19. The computing device of claim 12, wherein the controller is further configured to:
determine an available processing time based on a distance between the second audio assembly and the first audio assembly; and
adjust the audio filter based on the available processing.

20. A non-transitory computer readable medium storing instructions that, when executed by a processor, configure the processor to:
receive an audio signal from a computing device via a wireless connection with the computing device, the audio signal describing a sound made by a user of the computing device, wherein the audio signal arrives at a speaker assembly prior to the sound;
determine an audio filter to selectively adjust an amplitude of the sound;
apply the audio filter to the audio signal to generate audio content;
present, via the speaker assembly, the audio content to a user such that the presented audio content combines with the sound to selectively adjust the amplitude of the sound;
determine, using one or more sensors, a change in at least one of a location of the speaker assembly or a location of the computing device; and
adjust the audio filter based on the change.

* * * * *